(No Model.)
T. G. WALKER.
MANUFACTURE OF GLYCERINE.
No. 283,936. Patented Aug. 28, 1883.
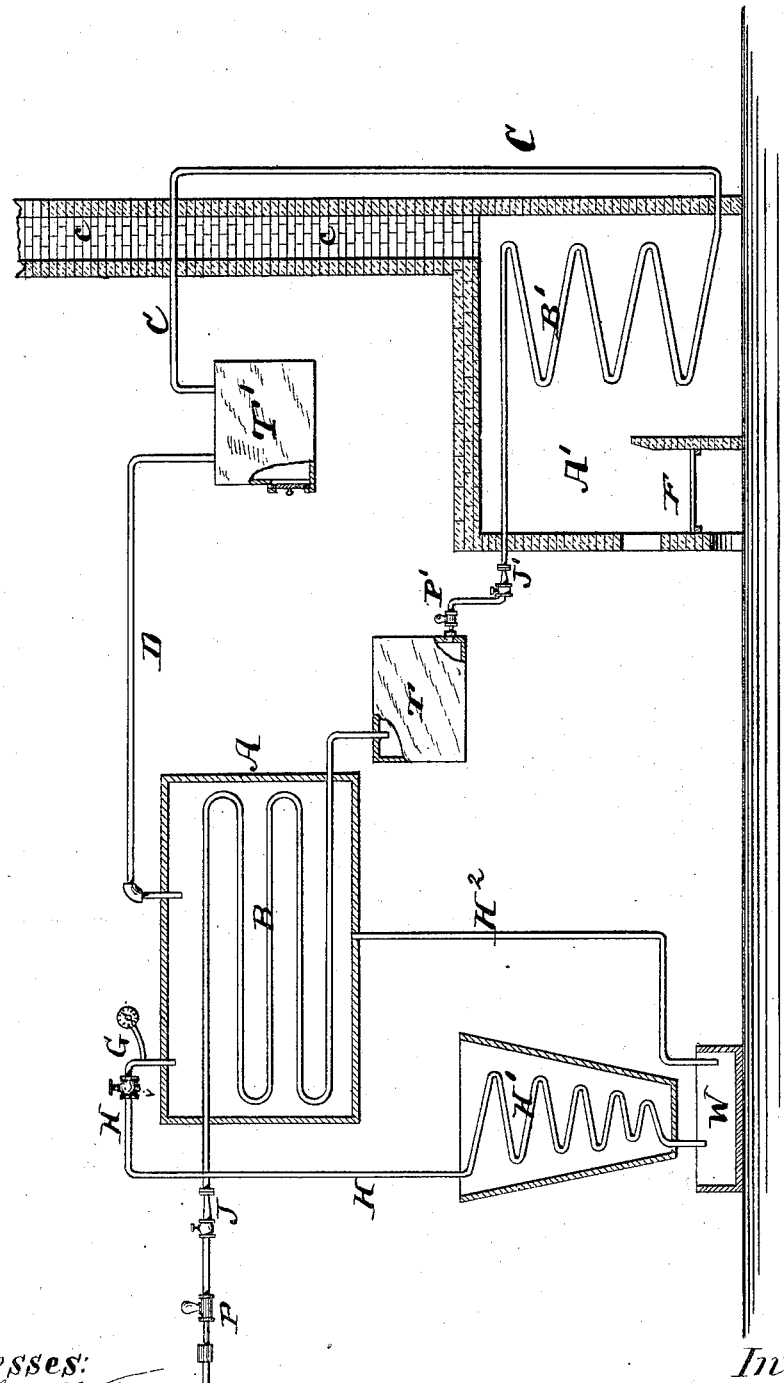

UNITED STATES PATENT OFFICE.

THOMAS GEORGE WALKER, OF MORRISTOWN, NEW JERSEY.

MANUFACTURE OF GLYCERINE.

SPECIFICATION forming part of Letters Patent No. 283,936, dated August 28, 1883.

Application filed June 19, 1883. (No model.)

*To all whom it may concern:*

Be it known that I, THOMAS GEORGE WALKER, of Morristown, Morris county, State of New Jersey, have invented a new process of and apparatus for the manufacture of glycerine from the mother-liquor or spent lye produced by soap-manufacture, or from other similar substances, of which the following is a specification.

The accompanying drawing, to which reference is made, shows a vertical section of the new apparatus in which my invention may be successfully operated.

A is a vessel heated from the pipe D, as hereinafter described. Through the vessel A passes a coil of pipe, B, furnished outside the vessel A with a steam-injector, J, and a pump, P, and terminating at the other end in a trap, T, which may have an opening to let the steam escape from it.

A' is an oven heated from a furnace, F, and provided with a chimney, $c$, in which oven is placed a second coil, B', likewise furnished with a steam-injector, J', and a pump, P'. The pipe B' issues from the trap T. The coil B', after passing out of the oven, terminates in a pipe, C, leading to a trap, T'. The trap T' is connected with the vessel A by the pipe D. The vessel A has an outlet at its upper 30 part by the pipe H, which pipe is provided with a pressure-gage, G, and with a valve, $v$, and forms a condensing-coil, H', leading to the tank W, which is also connected with the vessel A, but at its lower part, by the pipe $H^2$.

The mother-liquor from which glycerine is to be extracted is pumped from a tank (not shown in the drawing) into the coil B at P, where, at its entrance, it is taken up by a jet of steam from J and driven through the heated coil B, by which a large portion of the water contained in the liquor is evaporated, the contents of the coil B being discharged into the trap T, from which they are pumped into the coil B' by the pump P', at the entrance to which a jet of steam from the injector J', preferably superheated, takes them up and vaporizes them while passing through the heated coil B'.

The contents of the coil B' all pass into the closed trap T', where the solid ingredients settle, and from which they can be withdrawn from time to time, and the volatile products pass out of the top by the pipe D into the vessel A, and serve to heat the vessel A, and to keep the coil B at a suitable temperature for evaporating its contents. A portion of the fluid condenses in the vessel A and passes into the tank W by the pipe $H^2$, the volatilized portion passing out of the vessel A by the pipe H, on which the pressure-gage G should at all times show a pressure of five pounds, or more, to insure suitable heat in the steam-jacket A. The pipe H, forming a condensing-coil H', the vapor before reaching the tank W is condensed, and it is received there, ready for the refinery.

Having thus described my invention, what I claim as new, and desire to secure by Letters Patent, is—

1. The combination of the heater A and coil B with the furnace A' and coil B', and with means, substantially as described, for forcing the liquid to be treated through the coils B and B', as specified.

2. The combination of the heater A, coil B, furnace A', coil B', pipe C, trap T', pipes D H $H^2$, and tank W, substantially as herein shown and described.

3. The process of manufacturing glycerine, which consists in first heating the mother-liquor sufficiently to evaporate the water, and in then further heating it, so as to volatilize the said mother-liquor, as set forth.

4. The process of manufacturing glycerine, which consists in volatilizing the mother-liquor within a pipe by the aid of steam, and in then evaporating the water in a succeeding charge of the mother-liquor by the same steam, from which the volatilized glycerine has been removed by condensation, as set forth.

THOS. GEO. WALKER.

Witnesses:
  CHAS. D. SHIRMER,
  JOHN C. TUNBRIDGE.